United States Patent [19]

Hartmann

[11] Patent Number: 5,942,201
[45] Date of Patent: Aug. 24, 1999

[54] PROCESS UTILIZING TITANIUM DIOXIDE AS A CATALYST FOR THE HYDROLYSIS OF CARBONYL SULFIDE

[75] Inventor: Achim Hartmann, Pulheim, Germany

[73] Assignee: Kronos, Inc., Hightstown, N.J.

[21] Appl. No.: 08/011,563

[22] Filed: Feb. 1, 1993

[30] Foreign Application Priority Data

Mar. 5, 1992 [DE] Germany ............... 42 06 913

[51] Int. Cl.$^6$ ............... B01J 8/00; C01B 7/00; C01B 17/16; C01G 23/047
[52] U.S. Cl. ............ 423/244.01; 423/564; 423/613
[58] Field of Search ............ 423/244.01, 563, 423/613, 210, 564; 55/67; 502/527

[56] References Cited

U.S. PATENT DOCUMENTS

| | | | |
|---|---|---|---|
| 4,070,286 | 1/1978 | Iler et al. | 55/67 |
| 4,241,042 | 12/1980 | Matijevic et al. | 423/613 |
| 4,455,288 | 6/1984 | Salter et al. | 423/612 |
| 4,511,668 | 4/1985 | Nozue et al. | 423/564 |
| 4,847,234 | 7/1989 | Hums | 502/208 |
| 4,909,852 | 3/1990 | Atkinson | 106/436 |
| 5,171,551 | 12/1992 | Quemere | 423/244.01 |

*Primary Examiner*—Steven Bos
*Assistant Examiner*—Wendy Lovern
*Attorney, Agent, or Firm*—Michael J. Cronin

[57] ABSTRACT

The hydrolysis of carbonyl sulfide is substantially improved by utilizing titanium dioxide particles as a catalyst. It is especially favorable, if the titanium dioxide particle are sintered and treated with sodium hydroxide or sodium aluminate. Through such a treatment, the catalyst can be regenerated and reutilized.

10 Claims, No Drawings

PROCESS UTILIZING TITANIUM DIOXIDE AS A CATALYST FOR THE HYDROLYSIS OF CARBONYL SULFIDE

Removal of sulfur from exhaust gases is one of the most important environmental tasks facing many industrial manufacturers throughout the developed world. Many processes for the removal of sulfur involve the purification of exhaust gases by the removal first, by separation, of the sulfur which is in a carbonyl sulfur form. The present invention involves a process for hydrolysis of carbonyl sulfide which is normally conducted at elevated temperature. The novel process discovered utilizes titanium dioxide as a catalyst for the hydrolysis.

An example of a manufacturing process which produces sulfur as a by-product is the preparation of titanium dioxide pigments via vapor phase oxidation of titanium tetrachloride (the so-called chloride process). In this process titanium-containing ores or slags are chlorinated in a reducing atmosphere in a reactor at about 1000° C. Carbonaceous materials, such as petrol coke are used as a reducing agent. The gas mixture leaving the reactor contains besides the metal chlorides (particularly titanium tetrachloride and various metal chlorides), coke, unreacted ore, silicon dioxide, carbon dioxide, carbon monoxide, nitrogen, hydrogen chloride and, because of the sulfur content of the coke, carbonyl sulfide. After further treatment, the exhaust gas is burned before introduction into the atmosphere because of its carbon monoxide content; in this burning, carbonyl sulfide is converted into sulfur dioxide and carbon dioxide. The sulfur compounds must be removed from the exhaust gases under existing regulations.

Many other manufacturing processes in various industries from electrical utilities and chemical manufacturers to petroleum companies face similiar problems of sulfur removal from exhaust gases. It has been considered most practical to carry out the separation of the sulfur before the burning of the exhaust gas, because the quantity of gas to be purified is thus considerably smaller. The sulfur removal before exhaust gas burning comprises, however, at least 2 steps. First the hydrolysis of carbonyl sulfide, and then the oxidation of hydrogen sulfide to sulfur follows.

The present invention is directed primarily to an improvement in the process of hydrolysis of carbonyl sulfide in removing sulfur from exhaust gas. Many processes of oxidation of hydrogen sulfide to sulfur for the separation of hydrogen sulfide are well known. Although this discovery resulted from work on the manufacture of titanium dioxide, the invention is not limited to processes for manufacturing titanium dioxide but is believed to be of general utility and scope.

The reaction of carbonyl sulfide (with COS-portions in the gas mixture to 0.5% by volume) with water with use of aluminum oxide or titanium dioxide is described in European Patent No. 215 317 A1. Neutral or weakly alkaline gas mixtures can thus be desulfurized. Inasmuch as the gases also contain acidic components (for example, 1–2 ppm hydrogen chloride and hydrolysis products of titanium tetrachloride typical of the exhaust gases of the chloride process), the speed of the conversion decreases as a consequence of the quick depletion of the catalyst. Therefore, the catalyst has to be renewed frequently.

U.S. Pat. Nos. 4,485,189, 4,422,958 and 4,532,119 show processes where titanium dioxide is treated with alkaline earth sulfates to increase the conversion rate. It is apparent, however, that with this treatment the problem of increasing the catalyst stability in the case of hydrogen chloride-containing gases is also not satisfactorily solved, so that the hydrolysis of carbonyl sulfide must be carried out with the expensive, long well known process utilizing activated carbon. In the latter, however, problems with the disposal of solid waste and regeneration of the catalyst occur.

An object of the present invention is to make available a catalyst which accelerates effectively the transformation of carbonyl sulfide into hydrogen sulfide. Such catalyst should retain its effectiveness for a sustained period and, moreover, be economically able to be regenerated and reutilized.

The foregoing object has been achieved by the provision of a catalyst in the form of titanium dioxide particles. Such particles can be obtained as by-product in the manufacture of titanium tetrachloride or otherwise.

Sintered titanium dioxide particles, also known as scrub solids have been found to be particularly useful. These particles are used in the preparation of titanium dioxide according to the chloride process, if the reaction gases are to be cooled via indirect heat exchange, in that the cooling area can be maintain extensively free of unwanted coatings. The particles though a by-product in the preparation of titanium dioxide are believed available from other processes and sources as well. Their use as inert particulate material is described in, for example, U.S. Pat. No. 4,784,841. Such scrub particles consist of titanium dioxide, which may be subjected to additional calcining and have a particle size preferable above 0.15 mm. The term "scrub-solids" is also used for such particles.

It is a surprising discovery that such titanium dioxide particles are especially suitable for a catalytic process for hydrolsis of carbonyl sulfide since it is speculated that such a process takes place on the particle surface. Such particles have a relatively low specific surface area in the order of magnitude of 2 $m^2/g$.

Especially preferred as catalysts are titanium dioxide particles, which have been treated with an alkaline solution and calcined so that the alkali content of the titanium dioxide particle amounts to 0.01 to 0.20 weight percent sodium hydroxide or 0.01 to 0.03 weight percent potassium hyroxide (in each case based on water-free titanium dioxide). "Pure" titanium dioxide particles can also be used as catalyst. In such case, a supplementary treatment with sodium hydroxide or sodium aluminate as described below, will improve the catalyst suitability still further.

In principle, it does not depend on which industrial process the catalyst according to the present invention is to be used for the hydrolysis of carbonyl sulfide. The process is particularly suitable in the first step of the removal of sulfur from chlorinated exhaust gases.

In a titanium dioxide facility, the titanium dioxide particles used as the catalyst can in a practical way be operated within a closed cycle. The used catalyst can either be injected into the heat exchanger for cooling of the reaction gases in the gas-phase oxidation of titanium tetrachloride where it assumes its original function as scrub particles, or it can also be injected into the chlorination reactor where, in a practical sense as a raw material to be reacted, it is subjected to a conversion and leaves the reactor as titanium tetrachloride. Most importantly, no problems with the disposal of the catalyst occur.

The titanium dioxide particles used as the catalyst can also be regenerated in a simple manner by post-treating them again with sodium hydroxide or sodium aluminate.

Since in the catalytic hydrolysis it is a question of a surface reaction, the catalyst is used in the fluidized bed or in the fixed bed. The operating temperature is preferably in the range 100 to 200° C., with contact time on the order of seconds.

The hydrolysis of carbonyl sulfide is especially favorably expedited in accordance with the present invention if the titanium dioxide particles have been treated with sodium hydroxide solution or sodium aluminate solution. Used catalysts can also be reactivated by such a treatment. Regarding quantity, 1% sodium hydroxide or 1–2% sodium aluminate based on the titanium dioxide particles should be applied. The treatment with sodium aluminate is more effective than with sodium hydroxide.

DETAILED DESCRIPTION OF SOME EXAMPLES OF THE INVENTION

EXAMPLE 1

An exhaust gas was obtained with the following composition $CO$-42.4 vol. %
$CO_2$-30.7 vol. %
$COS$-0.43 vol. %
$H_2S$-1.0 ppm
$H_2O$-4.75 vol. %
$HCl$-2.0 ppm
$TiO\ Cl_2$-1.0 ppm
$N_2$-balance 4000 $Nm^3$/h of this gas were heated to 200° C. in a tubular heat exchanger and fed into a catalyst bed, consisting of 6000 l titanium dioxide solids of grain size 1–1.5mm. The catalyst was in a hollow cylinder with gas-permeable side wall of the dimensions:

| | |
|---|---|
| outer diameter | 1600 nm |
| inner diameter | 800 nm |
| cylinder height | 4000 nm |

The exhaust gas as treated after flow through the catalyst bed has the following composition:

$CO$-42.4 vol. %
$CO_2$-31.1 vol. %
$COS$-42.0 ppm
$H_2S$- 0.42 vol. %
$H_2O$-4.32 vol. %
$HCl$-2.0 ppm
$TiO\ Cl_2$-1.0 ppm
$N_2$ -balance From the gas analysis it is evident that 99% of the carbonyl sulfide was transformed into hydrogen sulfide. After 400 or 600 hours operating time the conversion was still 98.8% or 98.5%.

The hydrogen sulfide can be separated from the exhaust gas by washing with iron (III) or vanadium (VI)—containing solutions without problems according to various known processes.

EXAMPLE 2

This example is processed analogously to EXAMPLE 1, except that the exhaust gas contained 1.21 vol. % carbonyl sulfide before feeding into the contact apparatus. After the conversion there are 112 ppm corresponding to a carbonyl sulfide conversion of about 99%. After 800 hours operating time, the carbonyl sulfide conversion was reduced to 98.1%.

EXAMPLE 3

This is messed analogously to EXAMPLE 1 with the difference that the previously utilized titanium dioxide solids were sprayed before use with a 10% sodium hydroxide solution. The absorbed quantity of sodium hydroxide lies at about 1%, based on the mass of titanium dioxide. After the start of the experiment and after 600 hours, the carbonyl suflide conversion was unchanged at 99.3%.

A closed cycle for the titanium dioxide particles is also possible. A branch stream of the sintered titanium dioxide particles separated from pigment, calcined and, as a rule, post-treated with alkali is led through the contact apparatus, in which, in an especially preferred embodiment, these titanium dioxide particles are sprayed with sodium aluminate solution before their use. In the gas leaving the contact apparatus the carbonyl sulfide has been converted, more than 98% into hydrogen sulfide. In a apparatus connected at the outlet side, the hydrogen sulfide can then be oxidized via conventional methods to elemental sulfur.

The temperature in the catalyst bank in general should be 60° C., preferably above 80° C. The height of the catalyst bank and the rate of flow should preferably yield a contact time of 3 seconds or greater. Titanium dioxide particles with a mean particle diameter of 1.0 to 1.5 mm are very especially preferred.

For comparison, if the exhaust gas is treated only with steam (between 3 and 21 times the stoichiometric quantity of water) at temperatures around 140° C. without catalyst, practically no hydrolytic splitting of carbonyl sulfide was measured.

It has been shown that the catalyst of the present invention, even with the use of relatively sulfur-rich coke types and, as a consequence, higher carbonyl sulfide contents in the exhaust gas, permits a carbonyl sulfide hydrolysis conversion of about 98%.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for hydrolysis of carbonyl sulfide, comprising the steps of obtaining a catalyst constituting sintered titanium dioxide particles as a by-product in preparation of titanium dioxide via a chloride process and contacting a mixture of carbonyl sulfide and water with the catalyst.

2. The process according to claim 1, wherein the sintered titanium dioxide particles are post-treated with sodium hydroxide or sodium aluminate solution.

3. The process according to claim 1, wherein the process is conducted at an elevated temperature of at least 60° C.

4. The process according to claim 1, wherein the carbonyl sulfide is in a gas mixture with other gases.

5. The process according to claim 1, wherein the sintered titanium dioxide particles have a particle size in a range of 1.0 to 1.5 mm.

6. The process according to claim 1, wherein the titanium dioxide particles are prepared by being treated with an alkaline solution and calcined.

7. The process according to claim 1, wherein the titanium dioxide particles are regenerated by treatment with one of alkaline hydroxide solution and sodium aluminate solution to reactivate the catalyst.

8. The process according to claim 4, wherein the gas mixture has a hydrogen chloride content which is minimized to about 1–2 ppm before contact with the titanium dioxide particles.

9. Titanium dioxide particles for use in the process of claim 1 which have been treated with an alkaline solution and calcined.

10. The titanium dioxide particles according to claim 9, wherein alkali content is about 0.01 to 0.20 weight percent sodium hydroxide.

* * * * *